(12) United States Patent
Perez

(10) Patent No.: US 9,276,931 B2
(45) Date of Patent: Mar. 1, 2016

(54) METHOD AND APPARATUS FOR PROVIDING MULTIPLEXED SECURITY TOKEN VALUES

(71) Applicant: Verizon Patent and Licensing Inc., Basking Ridge, NJ (US)

(72) Inventor: John Scott Perez, Tampa, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 87 days.

(21) Appl. No.: 14/138,682

(22) Filed: Dec. 23, 2013

(65) Prior Publication Data

US 2015/0180867 A1 Jun. 25, 2015

(51) Int. Cl.
*H04L 29/06* (2006.01)

(52) U.S. Cl.
CPC .................................. *H04L 63/0876* (2013.01)

(58) Field of Classification Search
CPC ............................ G06F 21/31; H04L 63/0876
USPC ............................................................ 726/6
See application file for complete search history.

(56) References Cited

U.S. PATENT DOCUMENTS

| | | | |
|---|---|---|---|
| 8,978,152 B1* | 3/2015 | Rozenberg | H04L 63/0428 726/26 |
| 2003/0105964 A1* | 6/2003 | Brainard et al. | 713/178 |
| 2005/0166263 A1* | 7/2005 | Nanopoulos et al. | 726/7 |
| 2007/0150595 A1* | 6/2007 | Bhorania et al. | 709/226 |
| 2008/0130895 A1* | 6/2008 | Jueneman et al. | 380/277 |
| 2010/0107229 A1* | 4/2010 | Najafi et al. | 726/6 |
| 2010/0158246 A1* | 6/2010 | Neumann et al. | 380/44 |
| 2011/0145897 A1* | 6/2011 | Tyree | G06F 21/42 726/6 |
| 2012/0047563 A1* | 2/2012 | Wheeler | 726/6 |
| 2012/0324233 A1* | 12/2012 | Nguyen et al. | 713/179 |
| 2012/0331518 A1* | 12/2012 | Lee | 726/1 |
| 2014/0372752 A1* | 12/2014 | Sallis, David | 713/165 |

\* cited by examiner

*Primary Examiner* — Hadi Armouche
*Assistant Examiner* — Sakinah Taylor

(57) ABSTRACT

An approach for providing multiplexed security token values is described. A security token value multiplexing platform may determine a time interval for generating a security token value, wherein the time interval is different from a previous time interval at which a previous security token value was generated. The security token value multiplexing platform may further select an algorithm from a plurality of algorithms for generating the security token value based on the time interval. The security token value multiplexing platform may also generate the security token value using the algorithm.

20 Claims, 13 Drawing Sheets

METHOD AND APPARATUS FOR PROVIDING MULTIPLEXED SECURITY TOKEN VALUES

BACKGROUND INFORMATION

Many network services (or devices) require authentication of user devices (or user accounts) requesting access to the network services to ensure that the network services are accessible by only authorized or trusted users or user devices. As a way of authenticating the user devices, security tokens' values are utilized between the network service and the user devices. The network services authenticate the user devices by validating the security token values associated with the user device. Typically, the security tokens' values are generated based on single or multiple continuous algorithms at consistent time frequencies. The predictability of the security token values is critical because the security token values are more likely to be compromised when the security token values are more likely to be predicted. Using the multiple continuous algorithms over the single continuous algorithm may make the deployment of the security token values more secure, but the security token values may be still be predictable by plotting existing security token values that are collected over a period of time.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A method, apparatus, and system for providing multiplexed security token values, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to providing multiplexed security token values, it is contemplated that these embodiments have applicability to other systems operated by different entities and to other operations wherein data is retrieved.

Figure 1:
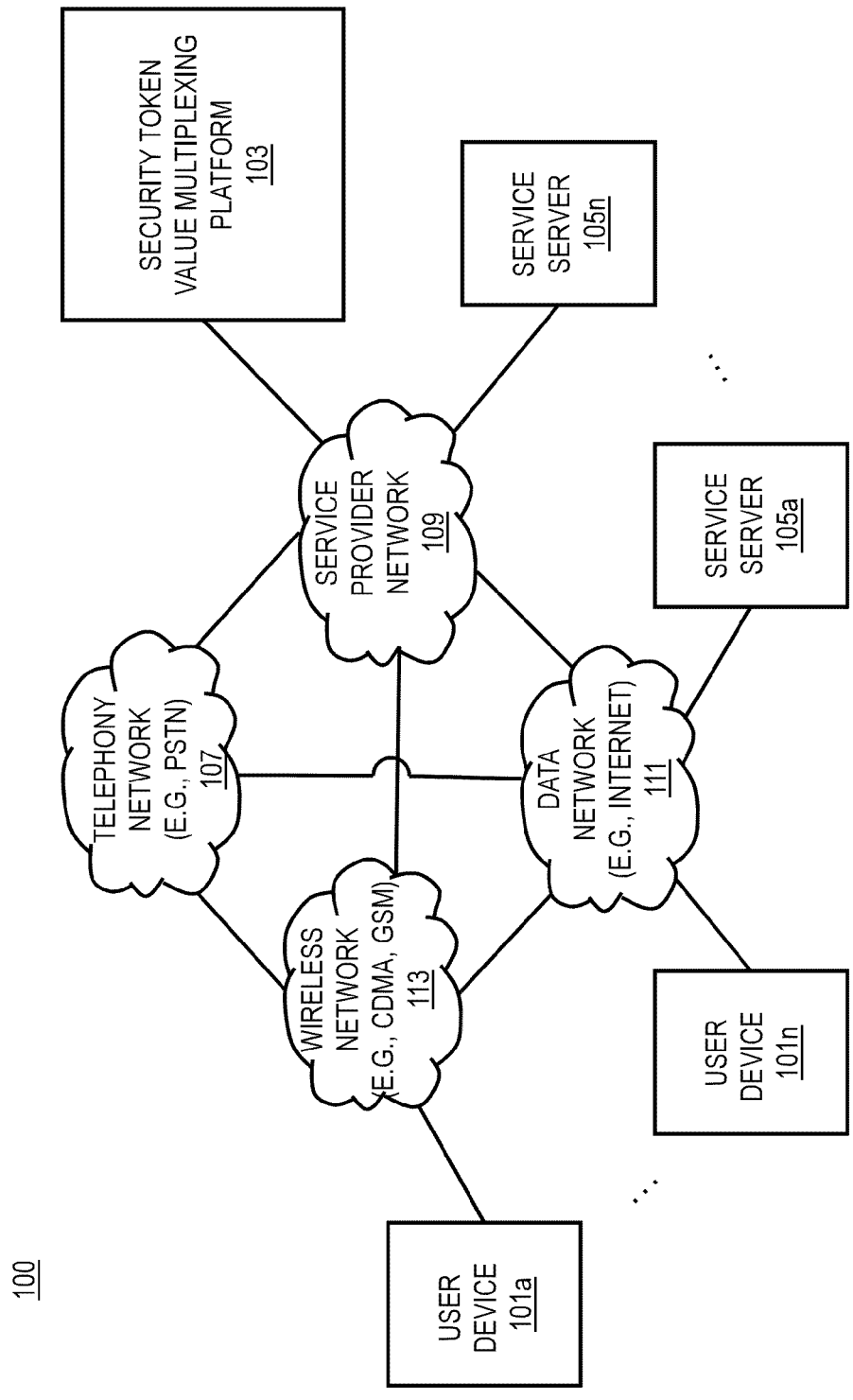
FIG. 1 is a diagram of a system capable of providing multiplexed security token values, according to an exemplary embodiment.
Figure 5:
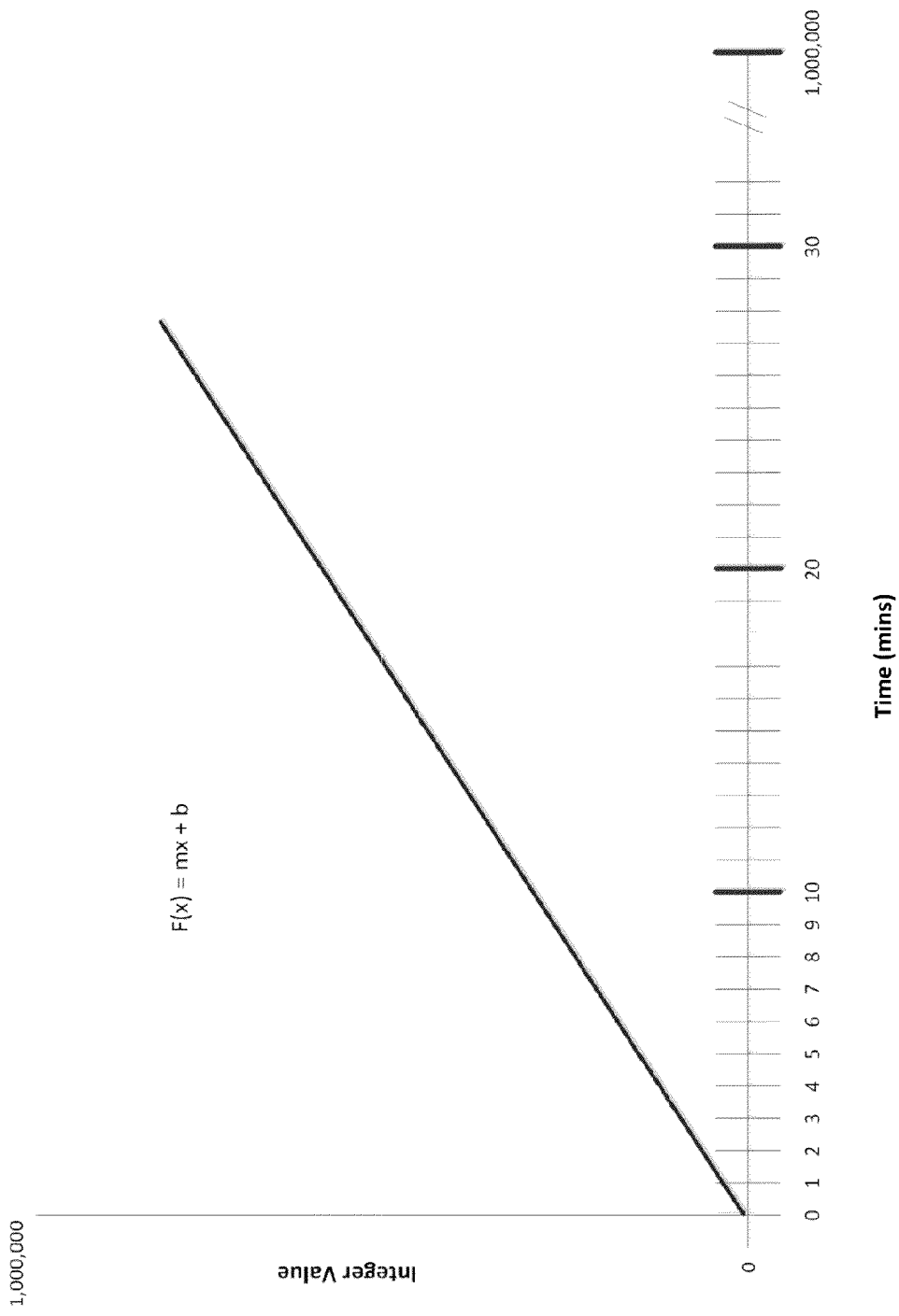
FIG. 5 is a graph of a simple linear function used for generating security token values, according to an exemplary embodiment.
Figure 6:
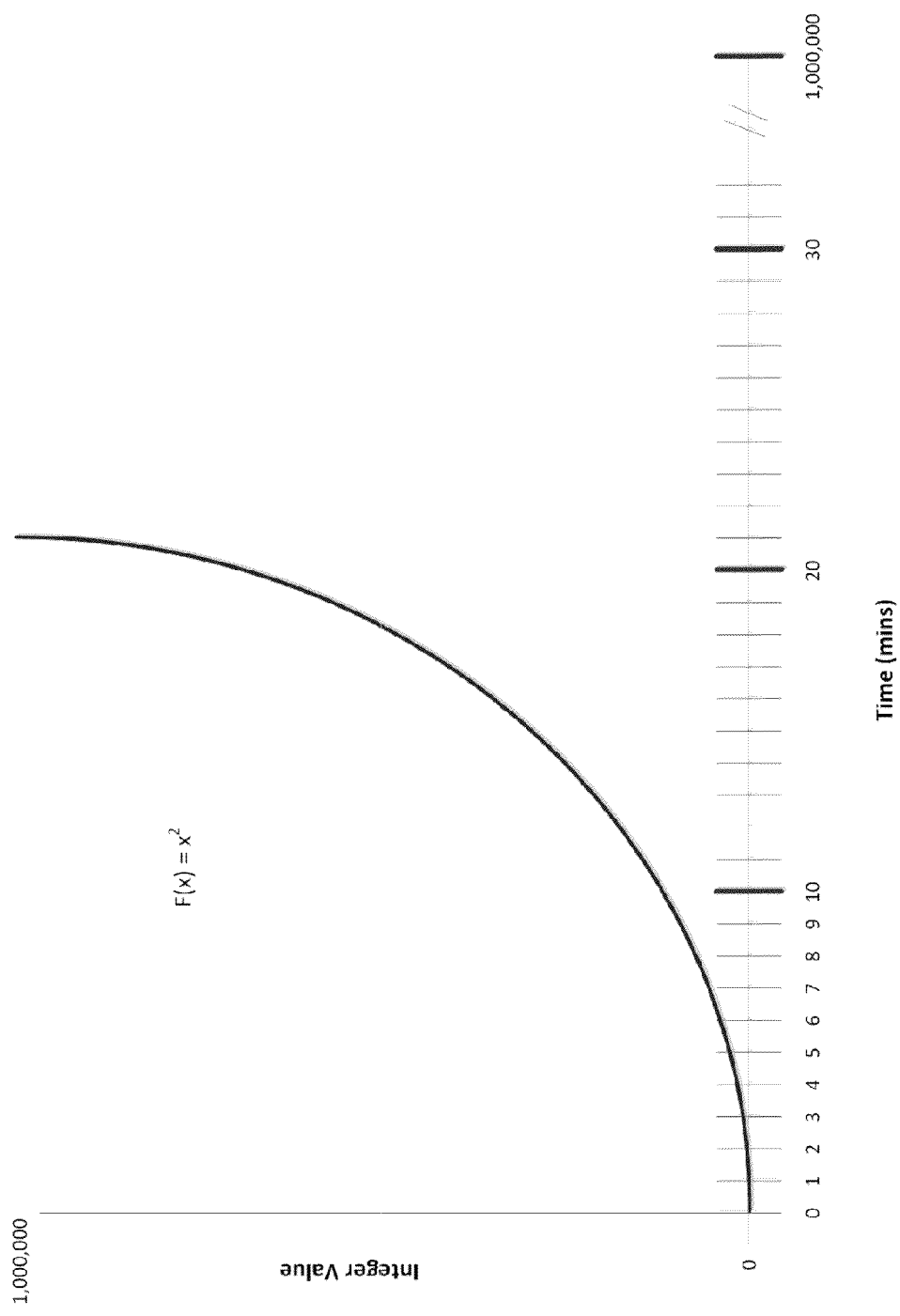
FIG. 6 is a graph of a simple parabolic function used for generating security token values, according to an exemplary embodiment.
Figure 7:
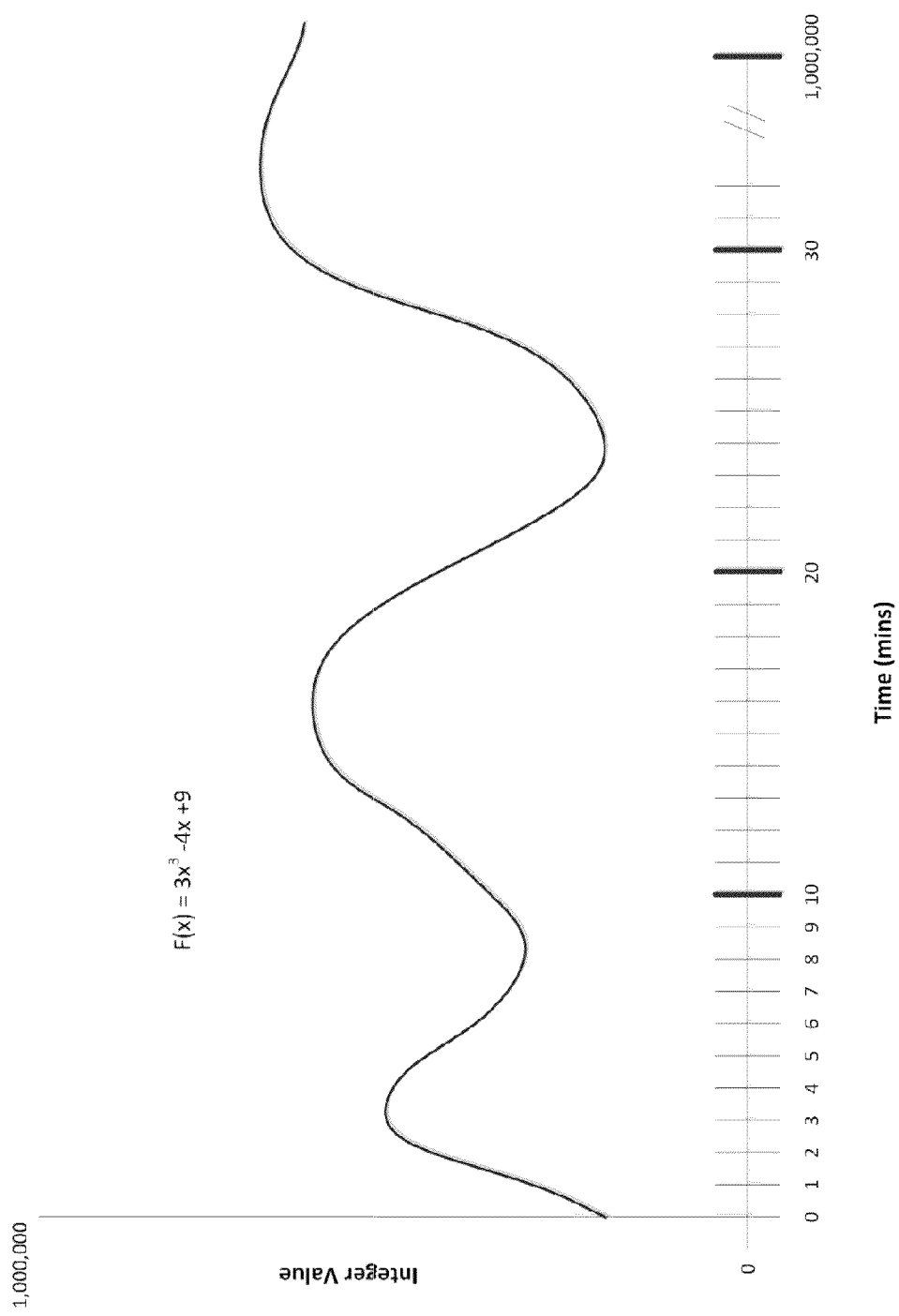
FIG. 7 is a graph of a simple polynomial function used for generating security token values, according to an exemplary embodiment.
Figure 8:
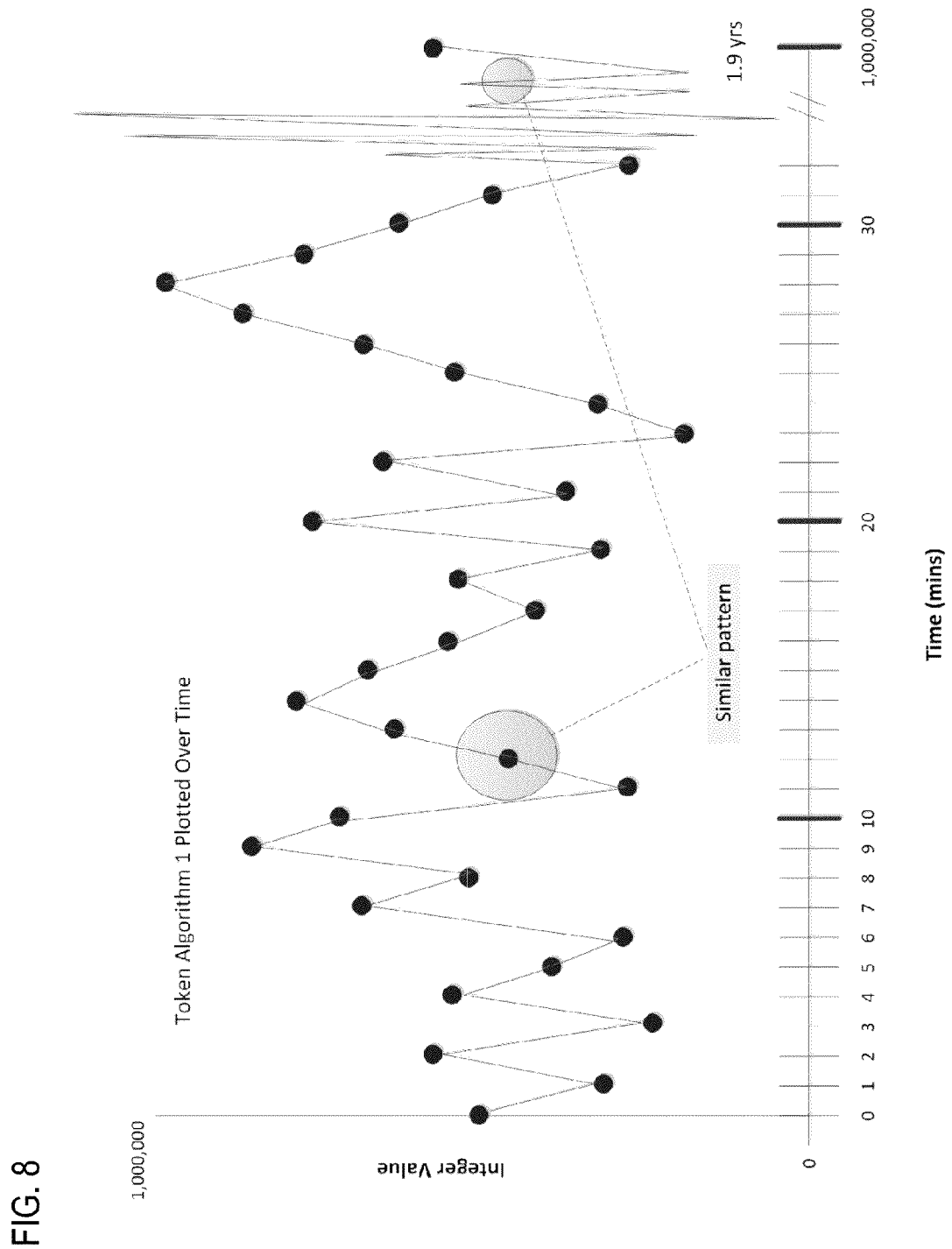
FIG. 8 is a plotted graph of a set of security token values generated based on an algorithm, according to an exemplary embodiment.

FIG. 1 is a diagram of a system capable of providing multiplexed security token values, according to an exemplary embodiment. As noted above, the security token values are utilized for network authentication. Typically, the security tokens' values (e.g., integer values) are generated based on algorithms of continuous functions. Examples of the continuous functions are illustrated in FIGS. 5-7. FIG. 5 is a graph of a simple linear function (e.g., $f(x)=mx+b$) used for generating the security token values, according to an exemplary embodiment; FIG. 6 is a graph of a simple parabolic function (e.g., $f(x)=x^2$) used for generating security token values, according to an exemplary embodiment; and FIG. 7 is a graph of a simple polynomial function (e.g., $f(x)=3x^2-4x+9$) used for generating security token values, according to an exemplary embodiment. The security token values are often generated by using a single continuous algorithm (or function) based on a user's personal identification number (PIN) and/or seed values. A service server that knows the single continuous algorithms of the security token value validates the authenticity for the security token, which ultimately authenticates the device and the user. The use of the multiple continuous algorithms for the security token value may make the deployment of the security token value more secure. For example, a 6-digit security token value is generated every minute. The probability of getting the 6-digit security token value is 1 in 1,000,000. The security token values can be collected over a period of time and can be plotted in a graph. FIG. 8 is a plotted graph of a set of (continuous) security token values generated based on an algorithm, according to an exemplary embodiment. As illustrated in FIG. 8, the 1,000,000 security token values can be collected over about 1.9 years, and plotted on the graph to predict the next security token value to be generated in the next time interval (e.g., in a minute). More security token values collected in the period of time may make the prediction of the multiple continuous algorithms more accurate, thereby making the security token values more likely to be compromised.

Figure 9:
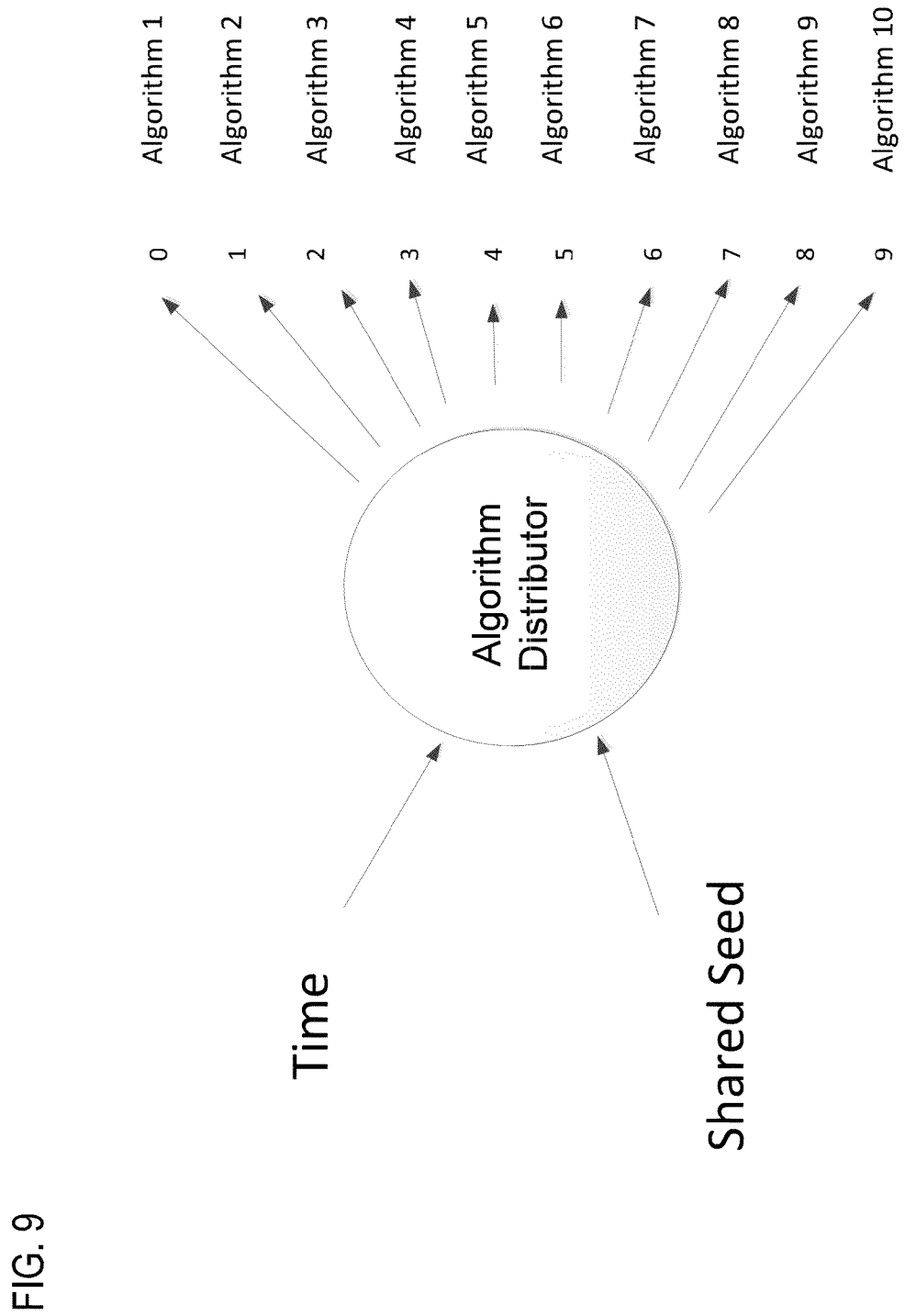
FIG. 9 is a diagram of an algorithm distributor used for generating multiplexed security token values, according to an exemplary embodiment.

To address this problem, a system 100 of FIG. 1 introduces the capability to provide multiplexed security token values. In one embodiment, the security tokens values may be generated in different intervals. Using a time algorithm may establish a means of creating a signaling scheme that can be used in parallel with the service server 105. The signaling scheme may be used in conjunction with n+1 algorithms for generating the security token values. For example, in a case where a security token value is generated 60 seconds after the last security token value was generated, an algorithm 1 may be used; in a case where a security token value is generated 59 seconds after the last security token value was generated, an algorithm 2 may be used; in a case where a security token value is generated 61 seconds after the last security token value is generated, algorithm 3 may be used; and in a case where a security token value is generated 70 seconds after the last token was generated, an algorithm 4 may be used. FIG. 9 is a diagram of an algorithm distributor used for generating multiplexed security token values, according to an exemplary embodiment. In one embodiment, the algorithm distributor (e.g., Mod 10) may determine an algorithm from the multiple algorithms (e.g., algorithm 1-algorithm 10) based on a time (e.g., time interval, current time, time table, etc.) and/or a seed value shared between the user device 101 and the service server 105. Each of the multiple algorithms may be associated with a different time, seed value, and/or other value determined based on the time and the seed value.

In one embodiment, the randomness of the time generation algorithm may contribute to the complexity of the multiplexing scheme. The random time intervals and the multiple algorithms may generate multiplexed security token values, which substantially decreases the accuracy of predicting security token values. The algorithms used in the multiplexed scheme may not easily be factored into a single algorithm from the plotting of the multiplexed security token values. Also, collecting the security token values over long periods of time to calculate a single algorithm may be very difficult. The modulated use of the multiple algorithms creates a multiplexed function that may not reveal the algorithm sets that are actually used. It may be extremely difficult to plot out a function that allows a hacker to accurately predict the security token values to be generated. For example, in a case where 7 algorithms are used for generating the security token values with 6 digits, the multiplexed scheme may be more than 7 times secure than using a single algorithm because of the complexity reverse engineering each algorithm may involve. Further, groups of the user device 101 may use different sets of algorithms instead of just different algorithms, thereby more securely hardening the security token values.

Figure 10:
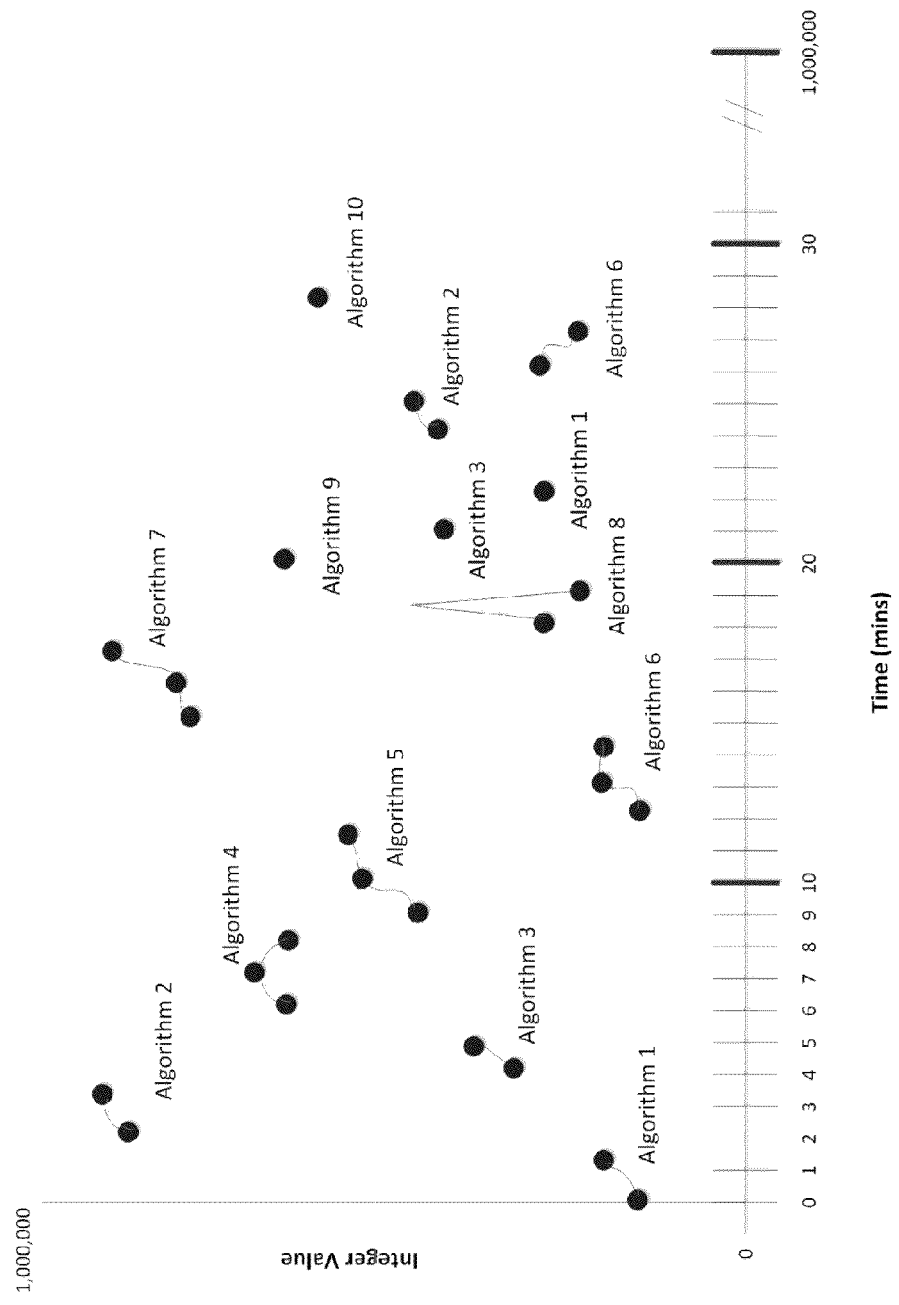
FIG. 10 is a plotted graph of a set of multiplexed security token values generated by the security token value multiplexing platform, according to an exemplary embodiment.

In one embodiment, the multiplexed scheme may be set up by using different types of algorithms, including parabolic, hyperbolic, linear, exponential, quadratic, cubic, elliptic, logarithmic, poly-logarithmic, trigonometric, complex polynomial, etc. It may be nearly impossible to drive a single continuous algorithm from the multiplexed function because the plot of the security token values is a multiplexed function, which is not derived from one type of mathematical function. For example, FIG. 10 illustrates a non-continuous generation of the security token values. FIG. 10 is a plotted graph of a set of multiplexed security token values generated by the security token value multiplexing platform, according to an exemplary embodiment. As illustrated in FIG. 10, the multiple algorithms, which are selected based on the time (e.g., time algorithm, time table, etc.) and the seed values, are plotted as non-continuous or broken unique algorithms. Because there is no pattern, continuity, or consistency of the security token values, the prediction of next security token values is almost impossible. Further, the security token values may be hardened by re-computing the security token values the same as the previous security token values. The security token values with all same numbers (e.g., "000000", "111111", etc.), which are considered as vulnerable and weak security token values, may be hardened by the re-computing of the security token values.

In one embodiment, the system 100 may include a security token value multiplexing platform 103 implemented as, for example, part of a service provider network 109 to generate multiplexed security token values used for the authentication process between user devices 101a-101n (collectively, user device 101) and service servers 105a-105n (collectively, service server 105). However, in alternative embodiments, the user device 101, the security token value multiplexing platform 103, and the service server 105 may be implemented as any part of the system 100. For example, the user device 101 may be implemented as part of the telephony network 107, the service provider network 109, the data network 111, or the wireless network 113. Also, the security token value multiplexing platform 103 may be implemented as any part of the user device 101 or the service server 105. The service provider network 109 can interact with one or more of other networks (e.g., telephony network 107, data network 111, and the wireless network 113).

In certain embodiments, the user device 101 may include any type of computing device comprising a mobile handset, mobile phone, mobile station, desktop computer, tablet computer, laptop computer, netbook computer, personal digital assistants (PDAs), smart phone, communication receiver, home phone, media receiver, wearable computer, a set-top box, etc. It is also contemplated that the user device 101 may support any type of user interface for supporting the presentment or exchange of data. In addition, the user device 101 may facilitate various input means for receiving and generating information, including touch screen capability, keyboard and keypad data entry, voice-based input mechanisms, and the like. Any known and future implementations of the user device 101 are applicable. It is noted that, in certain embodiments, the user device 101 may be configured to transmit information using a variety of technologies, including near field communication (NFC), radio-frequency identification (RFID), WiFi, Bluetooth®, infrared, etc. Also, connectivity may be provided via a wired or wireless local area network (LAN).

In certain embodiments, the security token value multiplexing platform 103 may determine a time interval for generating a security token value associated with the user device 101, wherein the time interval is different from a previous interval at which a previous security token value was generated. The security token value multiplexing platform 103 may determine the time interval using a pre-computed time table and/or a time algorithm. The security token value multiplexing platform 103 may use the time interval, the pre-computed time table, and/or the time algorithm as a signaling scheme for generating the security token value between the service server 105 and the user device 101. The security token value multiplexing platform 103 may also select an algorithm from a plurality of algorithms for generating the security token value based on the determined time interval. The plurality of algorithms include a parabolic function, a hyperbolic function, a linear function, an exponential function, a quadratic function, a cubic function, an elliptic function, a logarithmic function, a poly-logarithmic function, a trigonometric function, and/or a complex polynomial function. The security token value multiplexing platform 103 may further generate the security token value using the selected algorithm.

In certain embodiments, the security token value multiplexing platform 103 may regenerate the security token value based on a comparison of the security token value to the previous security token value. The security token value multiplexing platform 103 may regenerate the security token value if the comparison indicates that the security token value is the same as the previous security token value. The security token value multiplexing platform 103 may use a first seed value for generating the security token value and may use a second seed value for regenerating the security token value. The security token value multiplexing platform 103 may compare the security token value against a blacklist to determine whether to regenerate the security token value.

In certain embodiments, the service server 105 may include a system (software and hardware) that responds to requests from the user device 101 across the networks 107-113 to provide network services. The service server 105 can be run on a dedicated computer and the computer may provide several network services and have several servers running. The service server 105 may operate within a client-server architecture. The service server 105 may include computer programs running to serve the requests of other programs, e.g., the clients of the user device 101. The service server 105 may perform some tasks on behalf of the clients. The clients may connect to the service server 105 through the networks 107-113 but may run on the same computer. The service server 105 may provide services across the networks 107-113, either to private users inside a large organization or to public users via the Internet. The service server 105 may include a database server, a file server, a mail server, a print server, web server, gaming server, application server, or other kind of server. The service server 105 may know the same algorithms for generating the security token values as the user device 101, so that the service server 105 may validate the security token values associated with the user device 101 based on the algorithms, when the user device 101 requests access to the service server 105.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, the networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that the networks 107-113 may include components and facilities to provide for signaling and/or bearer communications between the various components or facilities of system 100. In this manner, the networks 107-113 may embody or include portions of a signaling system 7 (SS7) network, or other suitable infrastructure to support control and signaling functions.

Figure 2:
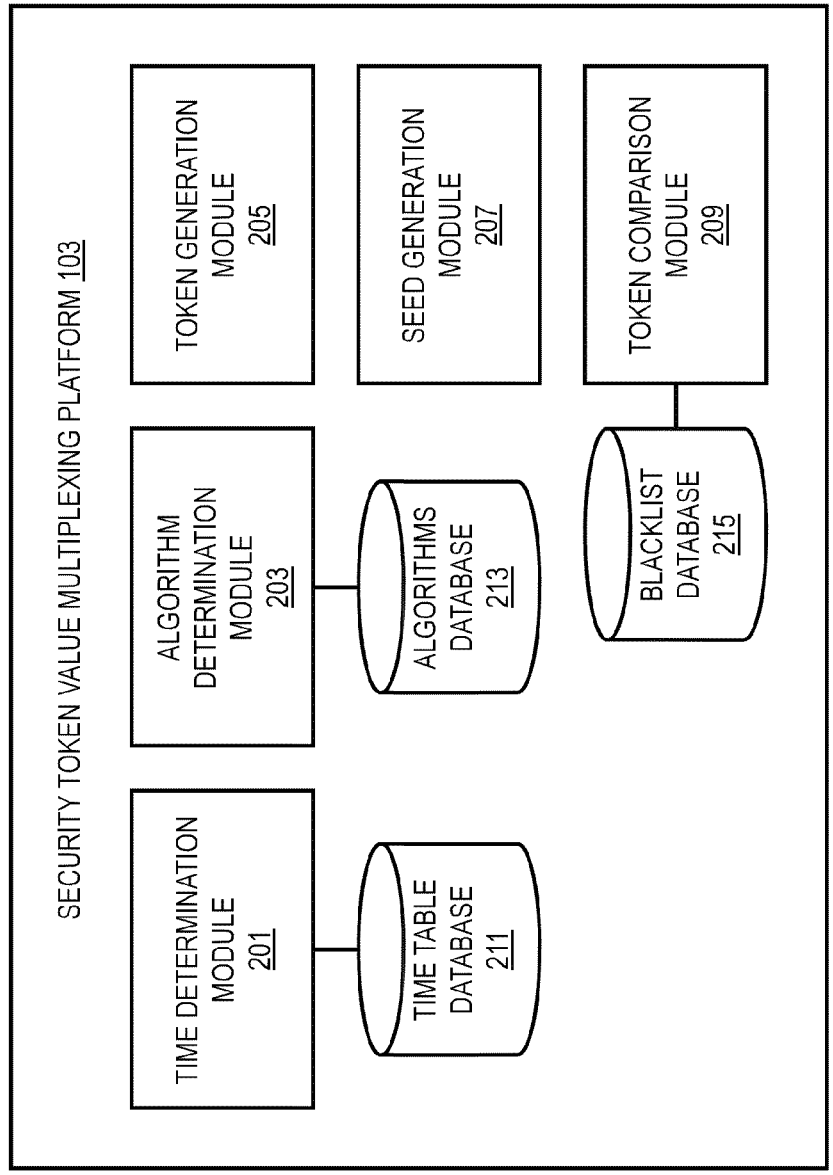
FIG. 2 is a diagram of a security token value multiplexing platform utilized in the system of FIG. 1, according to an exemplary embodiment.

FIG. 2 is a diagram of the security token value multiplexing platform 103 utilized in the system of FIG. 1, according to an exemplary embodiment. The security token value multiplexing platform 103 may include a time determination module 201, an algorithm determination module 203, a token generation module 205, a seed generation module 207, a security token comparison module 209, a time table database 211, an algorithms database 213, and a blacklist database 215.

In one embodiment, the time determination module 201 may be configured to determine a time interval for generating a security token associated with the user device 101. The time determination module 201 may also be configured to determine a time interval different from a previous time interval at which a previous security token value was generated. The time determination module 201 may further be configured to determine the time interval using a pre-computed time table stored in the time table database 211 and/or a time algorithm. The time algorithm may include an algorithm for selecting random times (e.g., seconds). The time interval, the pre-computed time table, and/or time algorithm may be used for establishing a means of creating a signaling scheme that can be used in parallel with the service server 105.

In one embodiment, the algorithm determination module 203 may be configured to select an algorithm from a plurality of algorithms for generating the security token values based on the time interval determined by the time determination module 201. The plurality of algorithms include a parabolic function, a hyperbolic function, a linear function, an exponential function, a quadratic function, a cubic function, an elliptic function, a logarithmic function, a poly-logarithmic function, a trigonometric function, and/or a complex polynomial function, etc.

In one embodiment, the token generation module 205 may be configured to generate the security token values using the algorithm selected by the algorithm determination module 203. The token generation module 205 may determine the security token value as a y value on the selected algorithm (or function) where the determined time interval is an x value. The token generation module 205 may also be configured to use the time interval, the pre-computed time table, and/or the time algorithm as a signaling scheme for generating the security token value between the user device 101 and the service server 105. The token generation module 205 may further be configured to determine to regenerate the security token value based on a comparison (by the security token comparison module 209) of the security token value to the previous security token value or a blacklist (a list of blacklist security token values and stored in the blacklist database 215). By way of example, the token generation module 205 may be configured to regenerate the security token value if the comparison indicates that the security token value is the same as the previous security token value. Further, the token generation module 205 may be configured to regenerate the security token value if the comparison indicates that the security token value is the same as the blacklist security token values in the blacklist. In addition, the token generation module 205 may be configured to generate the security token values based on seed values generated by the seed generation module 207. Different seed values may be used in respectively generating and regenerating the security token value.

In one embodiment, the seed generation module 207 may be configured to generate a seed or random seed used to generate the security token values. The seed or random seed may be a number (or vector). The seed generation module 207 may also be configured to generate the seed or random seed from the state of the computer system, such as the time. The seed generation module 207 may generate different security token values based on different seeds or random seeds.

In one embodiment, the security token comparison module 209 may be configured to compare the security token value to the previous security token value and determine if the security token value is the same as the previous security token value. The security token comparison module 209 may also be configured to compare the security token value against the blacklist and determine if the security toke value is the same as the blacklist security token value in the blacklist.

In one embodiment, the time table database 211 may be designed to store one or more pre-computed time tables which defines associations between the times (e.g., time intervals, certain times, etc.) and the algorithms used for generating the security token values. The pre-computed time tables may be generated and re-generated every pre-determined period of time (e.g., hourly, daily, weekly, monthly, etc.) The pre-computed time tables may randomly determine the time based on the time algorithm and associate the times with the algorithms. The user device 101 and the service server 105 may share the same time table such that both the user device 101 and the service server 105 know which algorithm is used for generating the security token value at a certain time or time interval.

In one embodiment, the algorithms database 213 may be designed to store various algorithms used for generating the security token values. The various algorithms may include mathematical functions, such as parabolic functions, hyperbolic functions, linear functions, exponential functions, quadratic functions, cubic functions, elliptic functions, logarithmic functions, poly-logarithmic functions, trigonometric functions, complex polynomial functions, etc.

In one embodiment, the blacklist database 215 may be designed to store blacklist security token values or a list of the blacklist token values. The blacklist security token values may include weak or vulnerable security token values that may be easily compromised. For example, all the same number values (e.g., "000000", "111111", etc.), sequential number values (e.g., "123456", "987654", etc.), or frequently repeated values may be considered as the weak or vulnerable security token values.

Figure 3:
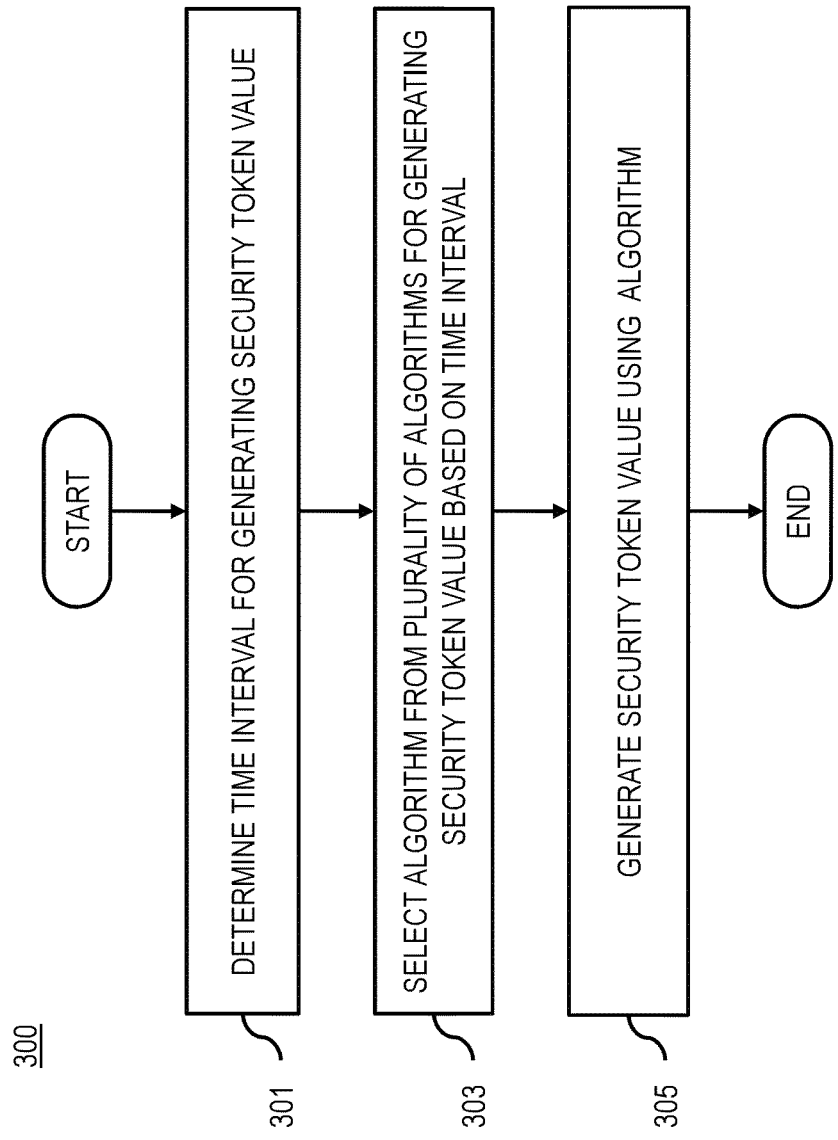
FIG. 3 is a flowchart of a process for providing multiplexed security token values, according to an exemplary embodiment.
Figure 4:
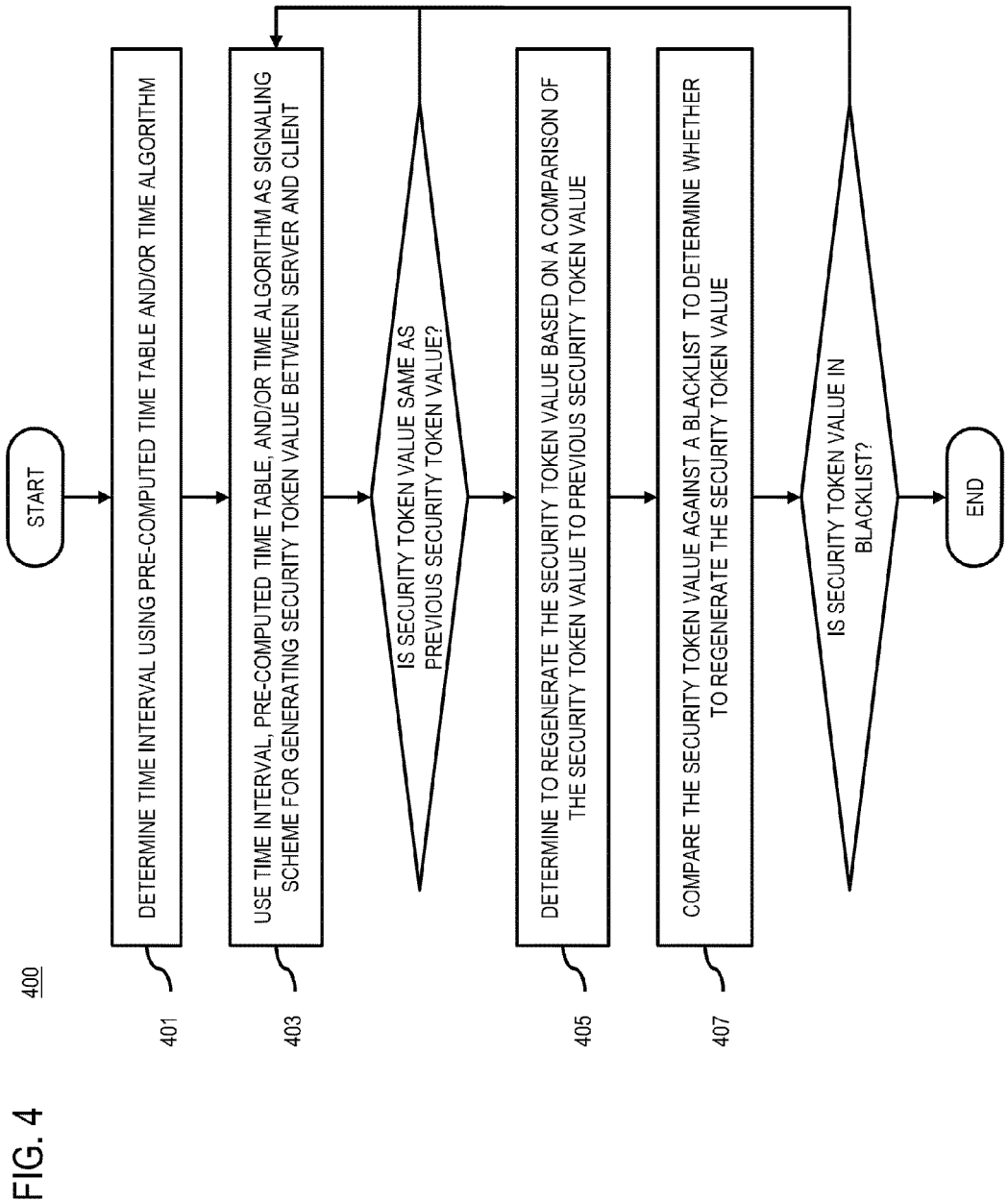
FIG. 4 is a flowchart of a process for providing multiplexed security token values, according to another exemplary embodiment.

FIGS. 3 and 4 are flowcharts of processes 300 and 400 for providing multiplexed security token values according to various exemplary embodiments. For illustrative purposes, the processes 300 and 400 are described with reference to FIG. 1. The steps of the processes 300 and 400 may be performed in any suitable order, as well as combined or separated in any suitable manner.

In particular, FIG. 3 is illustrated to describe the process 300 of providing from the perspective of the security token value multiplexing platform 103.

In one embodiment, the security token value multiplexing platform 103 may determine a time interval for generating a security token value via the time determination module 201. The determined time interval may be different from a previously determined time interval at which a previous security token value was generated (step 301). The time interval may include a random time in microseconds, seconds, minutes, etc. generated based on a time algorithm. The security token value may include a value (e.g., binary value, decimal value, hexadecimal value, alphanumeric values, etc.) associated with the security token generated in association with the authentication of the user device 101 accessing the service server 105. The non-decimal security values may be converted from/to decimal (or integer) values. For example, the determined time interval may be 60 seconds while the previously determined time interval may be 59 seconds.

In one embodiment, the security token value multiplexing platform 103 may select, via the algorithm determination module 203, an algorithm from a plurality of algorithms for generating the security token value based on the time interval determined in step 301 (step 303). The plurality of algorithms may include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof. The algorithm may be associated with the time interval in the pre-computed time table stored in the time table database 211. For example, an algorithm 1 (e.g., parabolic function) may be associated with 60 seconds in the pre-computed time table, and the algorithm 1 may be selected by an algorithm distributor (e.g., Mod 10) among multiple algorithms 1-10 based on the 60 seconds. In another example, an algorithm 2 (e.g., polynomial function) may be associated with 59 seconds in the pre-computed time table, and the algorithm 2 may be selected by the algorithm distributor among the algorithms 1-10 based on the 59 seconds.

In one embodiment, the security token value multiplexing platform 103 may generate, via the token generation module 205, the security token value using the algorithm selected in the step 303 (step 305). The security token value may be determined from a y value on the selected algorithm (or function) where the determined time interval is an x value. For example, where the time interval is 60 seconds and the selected algorithm is a parabolic function (e.g., $f(x)=x^2$), the y value on the parabolic function where the x value is 60 seconds may be determined as the security token value. For example, where the time interval is 59 seconds and the selected algorithm is a polynomial function (e.g., $f(x)=3x^2-4x+9$), the y value on the polynomial function where the x value is 59 seconds may be determined as the security token value. Further, the security token value multiplexing platform 103 may generate and regenerate the security token value based on a seed value determined by the seed generation module 207. The generation of the security token value may use a first seed value, and regeneration of the security token value may use a second seed value. Use of a first seed value and a different second seed value from the first seed value may decrease the likelihood that the regenerated security token value is the same as the generated security token value.

FIG. 4 is illustrated to describe the process 400 of providing multiplexed security token values from the perspective of the security token value multiplexing platform 103.

In one embodiment, the security token value multiplexing platform 103 may determine, via the time determination module 201, the time interval using a pre-computed time table stored in the time table database 211, and/or a time algorithm (step 401). The pre-computed time tables may define associations between the time intervals and the algorithms (or functions) used for generating the security token values. The pre-computed time tables may be generated and re-generated every pre-determined period of time (e.g., hourly, daily, weekly, monthly, etc.) The pre-computed time tables may randomly determine and associate the times with the algorithms based on the time algorithm. The time algorithm may include an algorithm for selecting random times (e.g., time intervals). For example, the time algorithm may generate different time intervals, and the pre-computed time table may associate the different time intervals with different algorithms. Also, the pre-computed time table may be updated every 12 or 24 hours so that it may be almost impossible for a hacker to predict the security token values.

In one embodiment, the security token value multiplexing platform 103 may use the time interval, the pre-computed time table and/or the time algorithm as a signaling scheme for generating the security token value between the service server 105 and the user device 101 (step 403). In that way, the user device 101 and the service server 105 may share the same time interval, pre-computed time table, and/or the time algorithm so that both the user device 101 and the service server 105 know which algorithm is used for generating the security token value at certain time intervals during the validation of the security token. For example, as the time interval, the pre-computed time table and/or the time algorithm associated with the service server 105 is updated, the time interval, the pre-computed time table and/or the time algorithm associated with the user device 101 may also be updated based on the updates signal.

In one embodiment, the security token value multiplexing platform 103 may determine to regenerate the security token value based on a comparison of the security token value to the previous security token value (step 405). The comparison of the security token value to the previous security token value may be performed by the security token comparison module 209. The security token value multiplexing platform 103 may determine, via the security token comparison module 209, if the security token value is the same as the previous security token value. The security token value may be regenerated if the comparison indicates that the security token value is the same as the previous security token value. For example, if the security token value is "131353" and the previous security token value was also "131353", the security token value may be regenerated so that the deployment of the security token values are more secured and the security token value is not easily compromised based on the previous security token value.

In one embodiment, the security token value multiplexing platform 103 may compare the security token value against the blacklist (stored in the blacklist database 215) to determine whether to regenerate the security token value (step 407). The blacklist may include a list of weak or vulnerable security token values (e.g., "000000", "111111", "123456", etc.) and may be stored in the blacklist database 215. The security token value multiplexing platform 103 may determine, via the security token comparison module 209, if the security token value is the same as the security token value in the blacklist. The security token value may be regenerated if the security token value is the same as the security token value in the blacklist. For example, if the security token value is "000000" and the black list includes the security token value "000000", the security token value may be regenerated so that the deployment of the security token values are more secured and the security token value is not easily compromised based on the blacklist security token value.

The processes described herein for providing a service over a communication session based on an authentication from a voice session may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
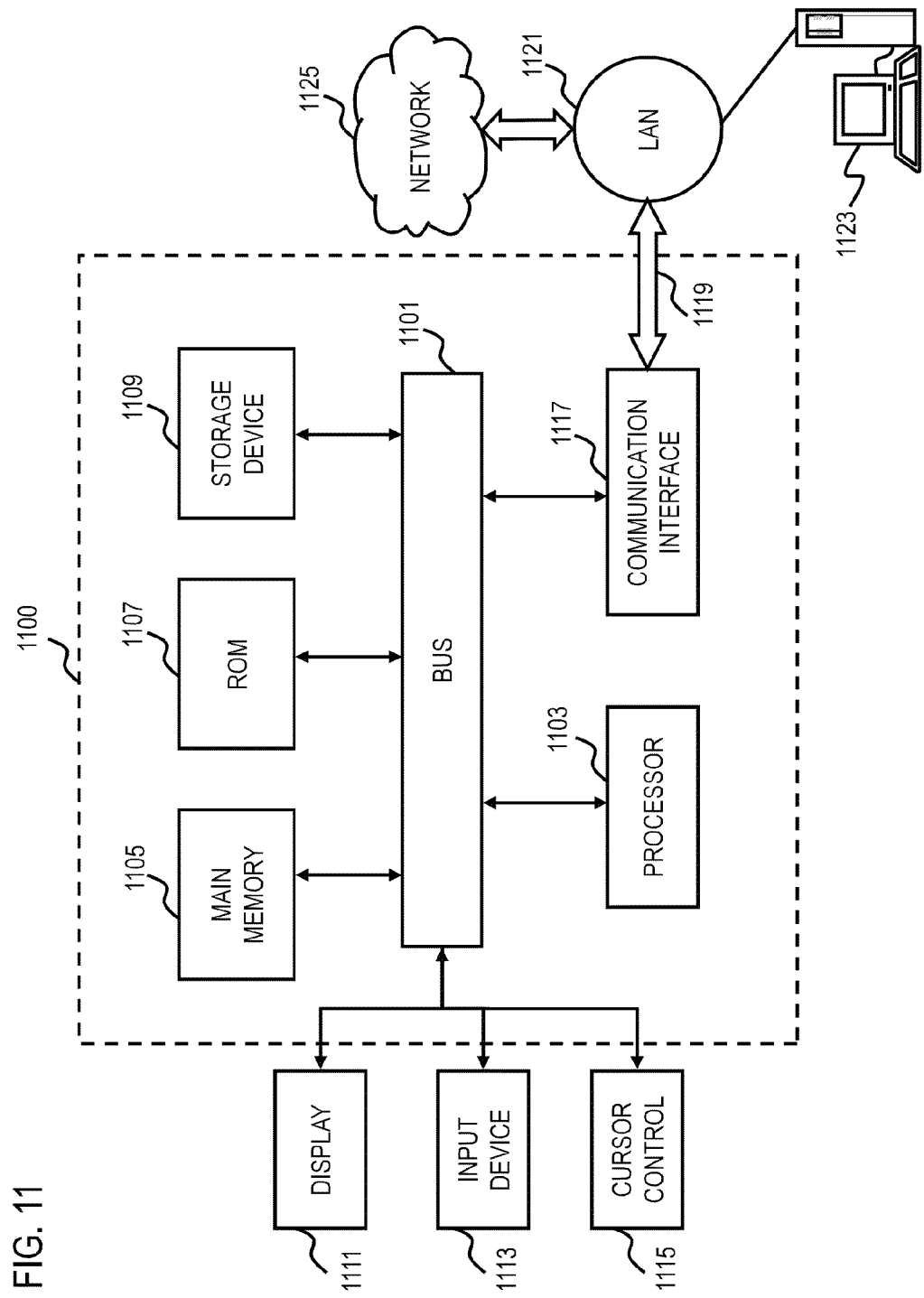
FIG. 11 is a diagram of a computer system that can be used to implement various exemplary embodiments.

FIG. 11 illustrates computing hardware (e.g., computer system 1100) upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as random access memory (RAM) or other dynamic storage device, coupled to the bus 1101 for storing information and instructions to be executed by the processor 1103. Main memory 1105 also can be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to the bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
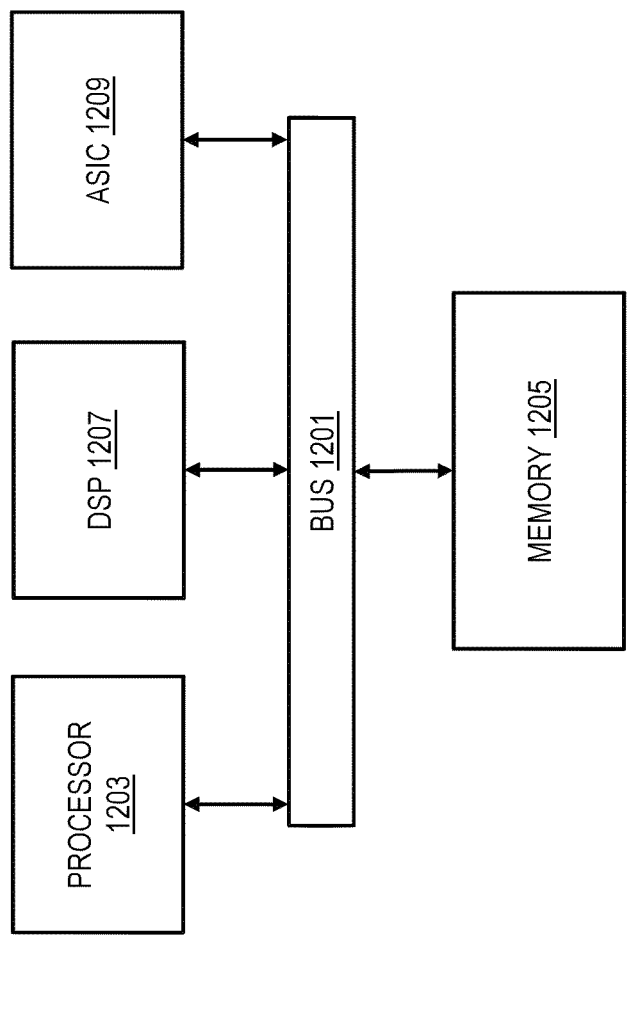
FIG. 12 is a diagram of a chip set that can be used to implement various exemplary embodiments.

FIG. 12 illustrates a chip set 1200 upon which an embodiment of the invention may be implemented. Chip set 1200 is programmed to provide multiplexed security token values and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of FIGS. 3 and 4.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide multiplexed security token values. The memory 1205 also stores the data associated with or generated by the execution of the inventive steps.

Figure 13:
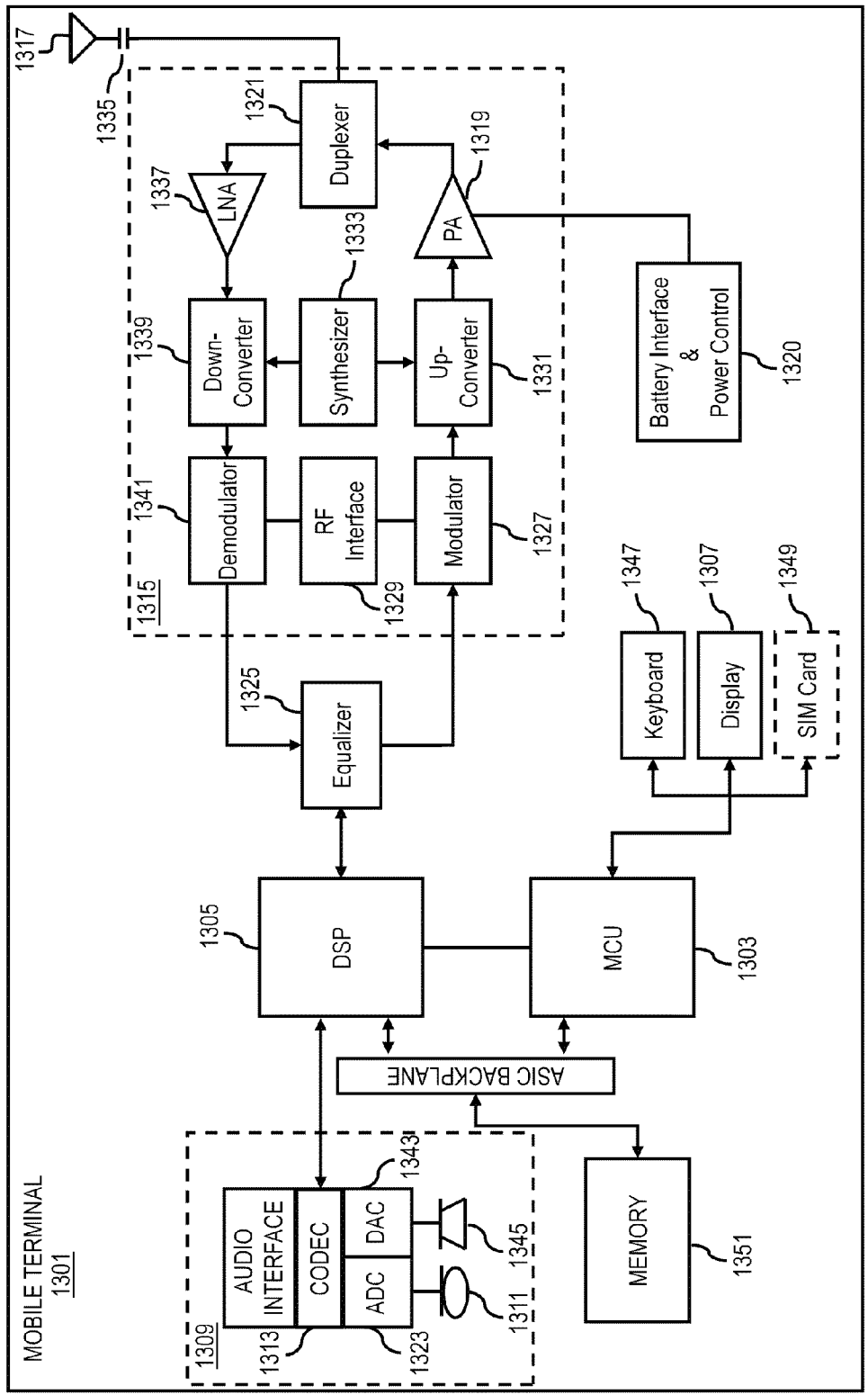
FIG. 13 is a diagram of a mobile device that can be used to implement various exemplary embodiments.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing multiplexed security token values. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry"

would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing multiplexed security token values. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide multiplexed security token values. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
storing in a database a plurality of different algorithms and a different time interval in association with said each different algorithm, a security token value for authenticating a client requesting access to a network service being generated with said each different algorithm;
determining a new time interval for generating a new security token value, wherein the new time interval is different from an immediate prior time interval to the new time intervals that was used for generating an immediate prior security token value, and wherein new time interval is determined using a pre-computed time table, a time algorithm, or a combination thereof;
selecting an algorithm from the plurality of different algorithms for generating the new security token value based on the new time interval, wherein selecting the algorithm comprises determining the one of the plurality of different algorithms having an associated time interval that corresponds to the new time interval;
generating the new security token value using the selected algorithm,
comparing the new security token value to the immediate prior security token value; and
upon condition that the comparing indicates the new security token value is the same as the immediate previous security token value, determining to regenerate the new security token,
wherein the generating of the new security token value uses a first seed value, and regenerating of the new security token value uses a second seed value.

2. A method of claim 1, further comprising:
using the new time interval as a value in the selected algorithm for generating the new security token value.

3. A method of claim 2, further comprising:
comparing the new security token value against a blacklist to determine whether to regenerate the new security token value.

4. A method of claim 2, wherein the plurality of algorithms include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof.

5. A method of claim 1, further comprising:
comparing the new security token value against a blacklist to determine whether to regenerate the new security token value.

6. A method of claim 5, wherein the plurality of algorithms include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof.

7. A method of claim 1, wherein the plurality of algorithms include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof.

8. A method of claim 7, further comprising:
comparing the new security token value against a blacklist to determine whether to regenerate the new security token value.

9. An apparatus comprising:
a memory storing a plurality different algorithms and a different time interval in association with each different algorithm, a security token value for authenticating a client requesting access to a network service being generated with said each different algorithm; and
a processor configured to:
determine a new time interval for generating a new security token value for authenticating a client requesting access to a network service, wherein the new time interval is different from an immediate prior time interval to the new time intervals that was used for generating an immediate prior security token value, and wherein the new time interval is determined using a pre-computed time table, a time algorithm, or a combination thereof;
select an algorithm from a plurality of algorithms for generating the new security token value based on the new time interval, wherein the select the algorithm comprises determine the one of the plurality of different algorithms having an associated time interval that corresponds to the new time interval;
generate the new security token value using the selected algorithm;
compare the new security token value to the immediate prior security token value; and
upon condition that the comparing indicates the new security token value is the same as the immediate previous security token value, determine to regenerate the new security token,
wherein the generating of the new security token value uses a first seed value, and regenerating of the new security token value uses a second seed value.

10. An apparatus of claim 9, wherein the processor is further configured to:
use the new time interval as a value in the selected algorithm for generating the new security token.

11. An apparatus of claim 10, wherein the processor is further configured to:
compare the new security token value against a blacklist to determine whether to regenerate the new security token value.

12. An apparatus of claim 10, wherein the plurality of algorithms include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof.

13. An apparatus of claim 9, wherein the processor is further configured to:
compare the new security token value against a blacklist to determine whether to regenerate the new security token value.

14. An apparatus of claim 9, wherein the plurality of algorithms include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof.

15. A system comprising:
a user device; and
a platform in communication with the user device, the platform including a memory storing a plurality different algorithms and a different time interval in association with each different algorithm, a security token value for authenticating a client requesting access to a network service being generated with said each different algorithm, the platform being configured to:
determine a new time interval for generating a new security token value for authenticating the user device requesting access to a network service, wherein the new time interval is different from an immediate prior time interval to the new time intervals that was used for generating an immediate prior security token value, and wherein the new time interval is determined using a pre-computed time table, a time algorithm, or a combination thereof;
select an algorithm from a plurality of algorithms for generating the new security token value based on the new time interval, wherein the select the algorithm comprises determine the one of the plurality of different algorithms having an associated time interval that corresponds to the new time interval;
generate the new security token value using the selected algorithm;
compare the new security token value to the immediate previous security token value;
upon condition that the comparing indicates the new security token value is the same as the immediate previous security token value, determine to regenerate the new security token value; and
share the new time interval with the user device and the network service,
wherein the generating of the new security token value uses a first seed value, and regenerating of the new security token value uses a second seed value.

16. A system of claim 15, wherein the platform is further configured to:
use the new time interval as a value in the selected algorithm for generating the new security token value.

17. A system of clam 16, wherein the platform is further configured to:
compare the new security token value against a blacklist to determine whether to regenerate the new security token value.

18. A system of clam 16, wherein the plurality of algorithms include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof.

19. A system of clam 15, wherein the platform is further configured to:
compare the new security token value against a blacklist to determine whether to regenerate the new security token value.

20. A system of clam 15, wherein the plurality of algorithms include a parabolic function, a hyperbolic function, a linear function, an exponential function, a quadratic function, a cubic function, an elliptic function, a logarithmic function, a poly-logarithmic function, a trigonometric function, a complex polynomial function, or a combination thereof.

* * * * *